United States Patent
Watts (10) Patent No.: US 7,522,298 B2
(45) Date of Patent: Apr. 21, 2009

(54) SELECTING A PRINT PATH SPEED (75) Inventor: Brian Watts, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1322 days.

(21) Appl. No.: 10/449,275

(22) Filed: May 30, 2003

(65) Prior Publication Data
US 2004/0239980 A1   Dec. 2, 2004

(51) Int. Cl.
G06F 3/12 (2006.01)
G06K 15/00 (2006.01)

(52) U.S. Cl. .................. 358/1.15; 358/1.5; 358/1.13

(58) Field of Classification Search .................. 358/1.5, 358/1.1, 1.6, 1.9, 1.12, 1.13, 1.14, 1.15, 1.18, 358/407, 468, 486; 271/3.01, 3.14, 227, 271/229, 270
See application file for complete search history.

(56) References Cited

U.S. PATENT DOCUMENTS 5,018,716 A * 5/1991 Yoshida et al. .............. 271/227

* cited by examiner

Primary Examiner—Dov Popovici (57) ABSTRACT

A method for selecting a print path speed for an image forming device includes identifying a print path status. A print path status may be determined to be empty, operating at a first speed, or operating at a second speed that is faster than the first speed. The print pat speed for a page is then set according to the print path status.

31 Claims, 5 Drawing Sheets

| Page: 1 | No Speed Reduction<br>Status=0   Set Speed=1<br>Max=1        Set SRC=1<br>Print Duration=2 seconds |

| Page: 2 | Speed Reduction<br>Status=1   Set Speed=1<br>Max=2        Set SRC=2<br>Print Duration=2 seconds |

| Pages: 3, 5, 7 & 9 | No Speed Reduction<br>Status=1   Set Speed=1<br>Max=1        Set SRC=1<br>Print Duration=2 seconds<br>(8 seconds total) |

| Pages: 4, 6, 8 & 10 | Speed Reduction<br>Status=1   Set Speed=1<br>Max=2        Set SRC=2<br>Print Duration=2 seconds<br>(8 seconds total) |

| Page: 11 | Speed Reduction<br>Status=1   Set Speed=1<br>Max=2        Set SRC=3<br>Print Duration=2 seconds |

| Page: 12 | Speed Reduction<br>Status=1   Set Speed=1<br>Max=2        Set SRC=4<br>Print Duration=2 seconds |

| Page: 13 | Speed Reduction<br>Status=1   Set Speed=1<br>Max=2        Set SRC=5<br>Print Duration=2 seconds |

Clear the Path
Delay=2 seconds

| Pages: 14-20 | No Speed Reduction<br>Status=2   Set Speed=2<br>Max=2        Set SRC=1<br>Print Duration=1 second<br>(7 seconds total) |

FIG. 7

SELECTING A PRINT PATH SPEED

BACKGROUND

An image forming device such as a laser printer or copier can be rated by the number of pages it can print in a minute. When printing, each page is retrieved from an input tray, transported past components that dispense and fix imaging material such as ink or toner, and then deposited in an output bin. The path between the input tray and the output bin is referred to as a print path. The number of pages that can be printed in a minute depends directly on the print path speed, that is, the speed at which each page travels through the print path.

For a variety of reasons, a given image forming device may be able to support two or more print path speeds. For example, an image forming device may have two input trays. The pick mechanism for retrieving pages from the first tray may be slower than the pick mechanism for the second tray. So, when the first input tray is used, the print path speed is slower than when the second input tray is used. An image forming device such as a laser printer may be capable of printing on pages of varying sizes. Narrow width pages such as envelopes are processed at a slower print path speed to ensure that toner is properly fused. Full width pages can be processed at a faster speed.

Two or more pages may be held within a print path at a given time, so changes in print path speed affect all pages in the path. Consequently, before a print path speed can be increased or decreased, the print path must be cleared. Clearing the print path involves allowing all pages to be dispensed in an output bin before retrieving the next page from an input tray. This results in a delay that can equal or exceed the time it takes to print a page at slow speed.

DETAILED DESCRIPTION

INTRODUCTION: When the print path speed of an image forming device remains constant, page after page can be printed without adjustment. However, before the print path speed can be increased or decreased, the print path must be cleared of all pages. In some situations, clearing the print path can result in an unnecessary delay.

Imagine an image forming device capable of printing sixty pages per minute at full speed—that is one page per second. At half speed the image forming device prints at thirty pages per minute—that is one page every two seconds. Clearing the print path can result in a two second delay. So, it takes five seconds to print one page at half speed, clear the print path, and then print a second page at full speed. On the other hand, it would take only four seconds to not clear the path and print both pages at half speed. Accordingly, embodiments of the present invention help to increase overall print speeds by taking into account the delay incurred by clearing the print path.

Figure 5:
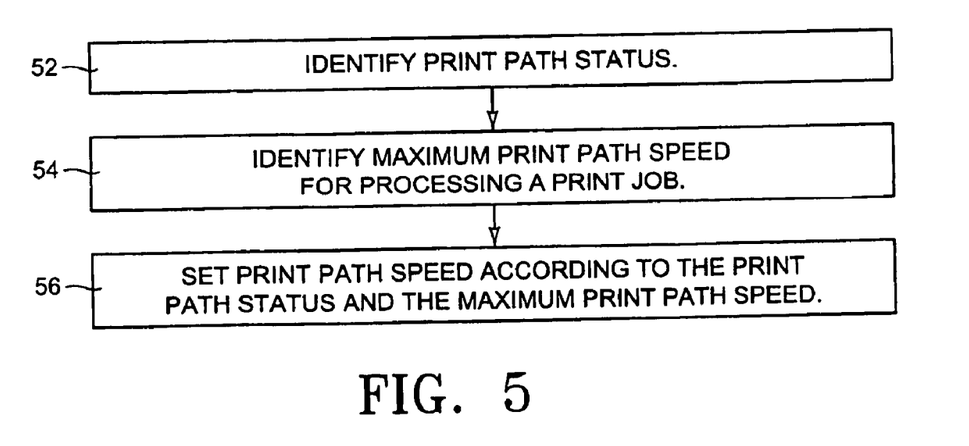
FIG. 5 is an exemplary flow diagram illustrating steps taken to select a print path speed according to an embodiment of the present invention.
Figure 6:
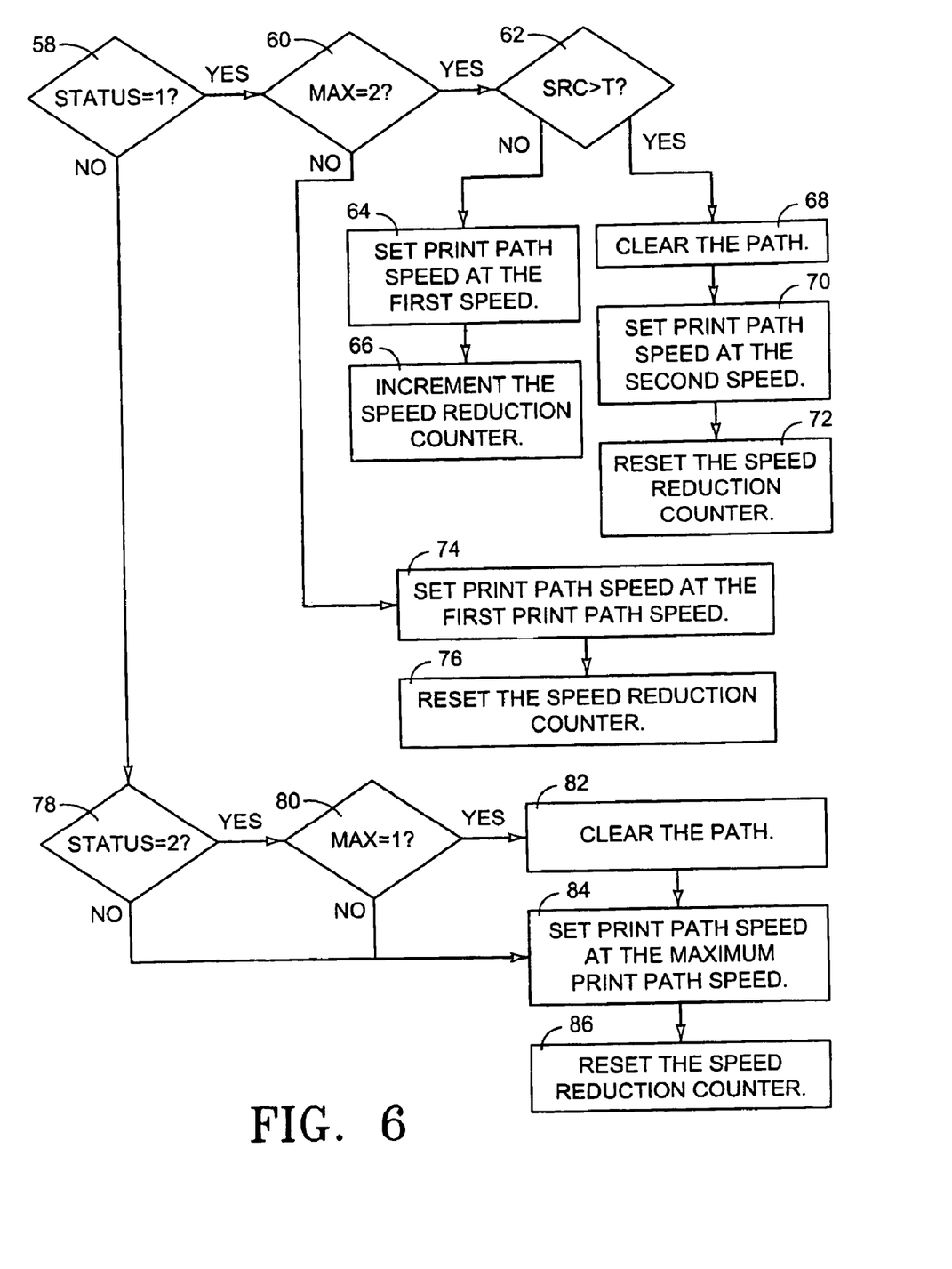
FIG. 6 is an exemplary flow diagram further illustrating the steps taken to select a print path speed according to an embodiment of the present invention.

The following description is broken into sections. In the first section, the hardware and programming components of various embodiments of the present invention are described with reference to FIGS. 1-4. With reference to FIGS. 5 and 6, the second section describes the operation of those hardware and programming components. In the third section an example is described in which a sequence of twenty pages are printed by an image forming device that implements an embodiment of the present invention.

Figure 1:
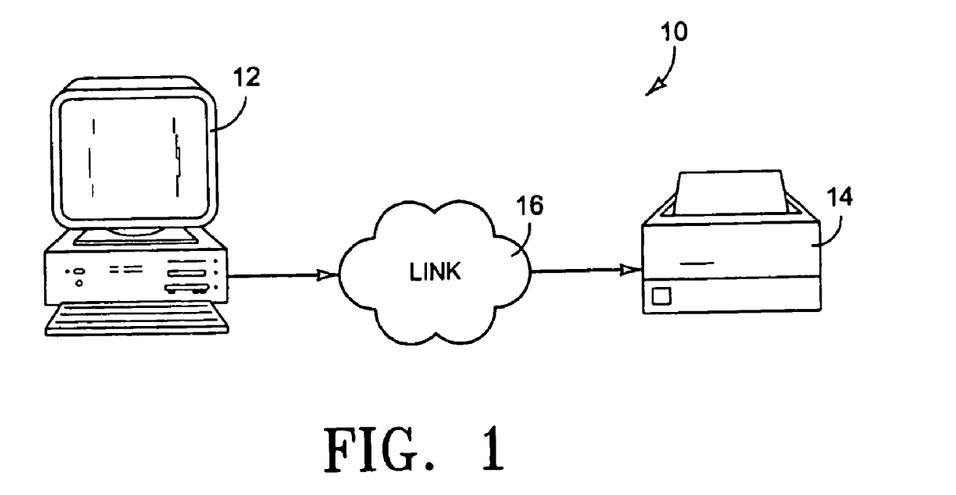
FIG. 1 illustrates an exemplary environment in which embodiments of the present invention can be implemented.

COMPONENTS: FIG. 1 illustrates an exemplary environment 10 in which various embodiments of the present invention may be implemented. Environment 10 includes computer 12 and image forming device 14 interconnected by link 16. Computer 12 represents any computing device capable of sending a print job to image forming device 14. A print job is a series of instructions directing image forming device 14 to form physical representation(s) of digital image(s) on one or more pages. The term page includes a sheet of paper and any other print media such as, but not limited to, an envelope or transparency. Print job instructions may include directions to form text, graphics, or a combination of both.

Image forming device 14 represents generally any device capable of forming a printed image on a page. Examples include laser printers, ink printers, copiers, facsimile devices, and multi-function all-in-one devices. Link 16 represents generally a cable, wireless, or remote connection via a telecommunication link, an infrared link, a radio frequency link, or any other connector or system that provides electronic communication between computer 12 and image forming device 14. Link 16 may include an intranet, the Internet, or a combination of both.

Figure 2:
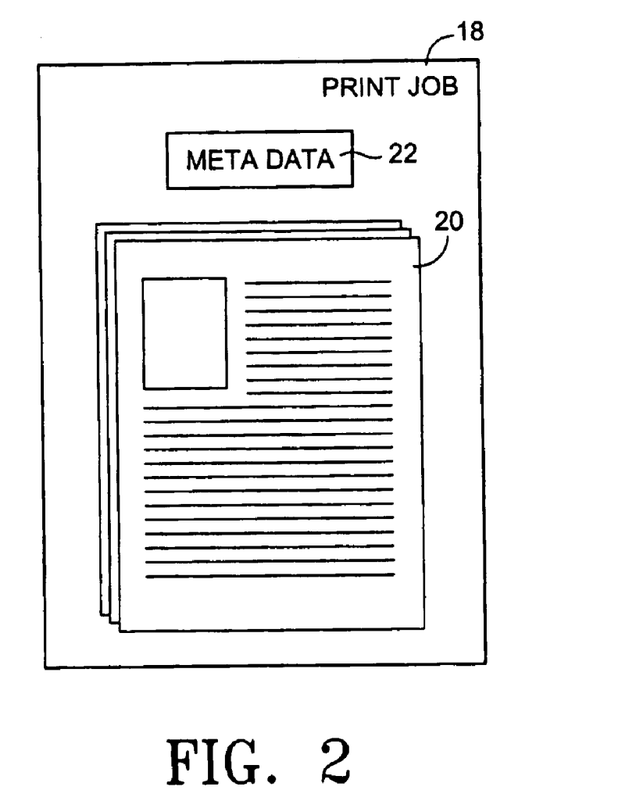
FIG. 2 illustrates the logical elements of an exemplary print job.

Referring now to FIG. 2, print job 18 includes image data 20 and meta-data 22. Image data 20 represents generally any data identifying the layout and contents of one or more pages. Meta-data 22 represents default and/or user defined printing options. One or more of the printing options can affect print path speed for one or more pages of the print job. Among many others, printing options can include options specifying the media size to be used, an input tray, an output bin, page orientation, and print quality.

Figure 3:
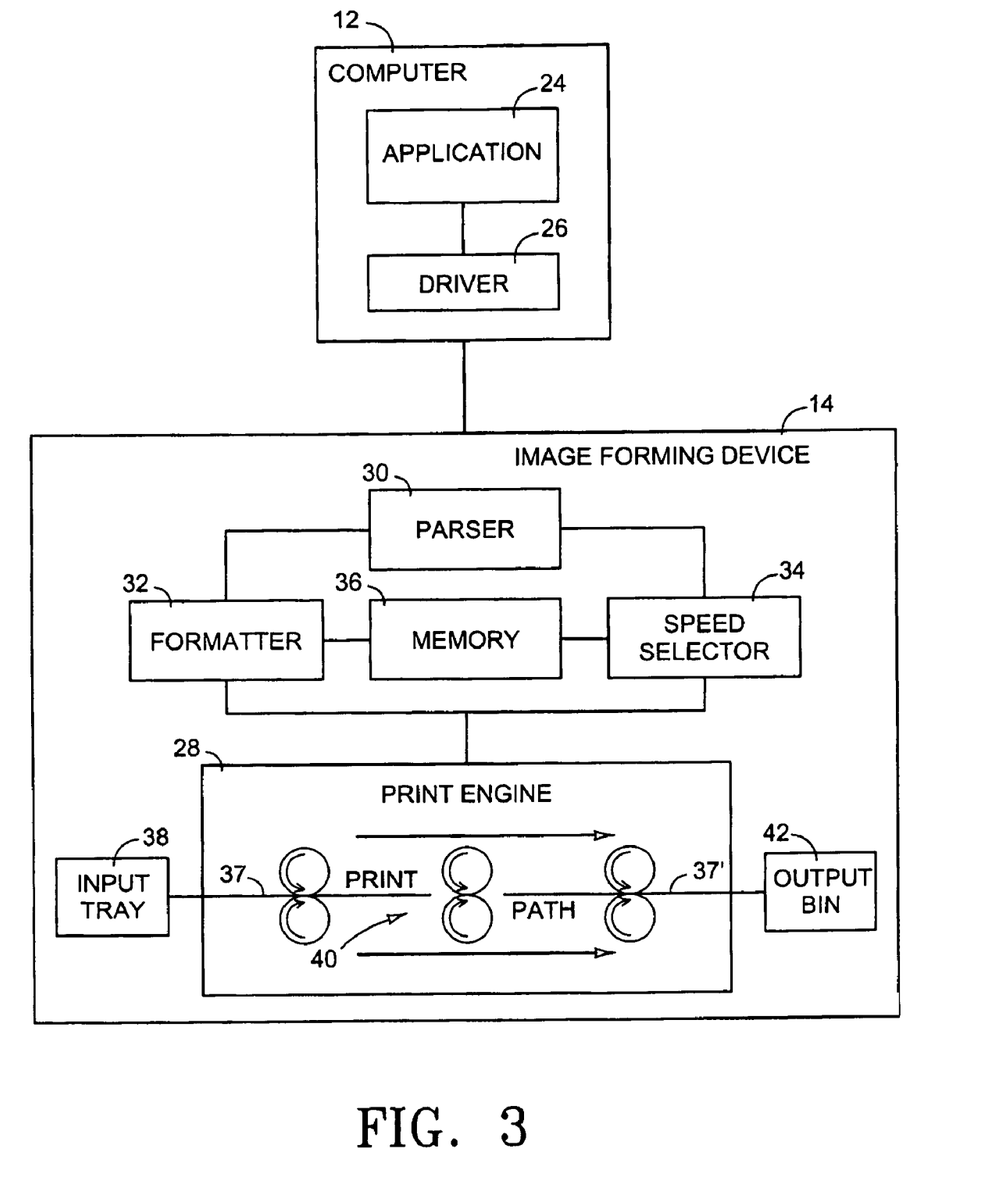
FIG. 3 is a schematic representation of the physical and logical components of a computer and exemplary image forming device according to an embodiment of the present invention.

Referring to FIG. 3, computer 12 includes application 24 and driver 26. Application 24 represents any programming capable of instructing that an electronic document be printed. For example, application 24 may be a word processor or other desktop publishing application. Driver 26 provides programming for translating printing instructions from application 24 into device-specific instructions—a print job—for image forming device 14. Driver 26 is also responsible for generating and presenting a user interface that allows the user to specify printing options to be included in meta-data 22.

As shown, image forming device 14 includes print engine 28, parser 30, formatter 32, speed selector 34, and memory 36. Print engine 28 represents generally any combination of hardware capable of forming printed images on one or more pages 37 and 37'. To form a printed image, print engine 28 takes page 37 from input tray 38, forms a printed image on page 37 as it passes page 37 along print path 4C, and dispenses page 37 in output bin 42. It is noted that input tray 38 may represent two or more input trays and that output bin 42 may represent two or more output bins. Print path 40 is the physical path or paths that pages 37 and 37' follow between input tray 38 and output bin 42.

Parser 30 represents generally any programming capable of parsing meta-data 22 from print job 18. Parser 30 is responsible for supplying meta-data 22 to formatter 32 and speed selector 34. Formatter 32 represents generally any programming capable of processing image data 20 from print job 18 to direct print engine 28 to form printed images. Formatter 32 may process print job 18 by rendering image data 20 into a bitmap image or images that define each pixel to be printed. Speed selector 34 represents generally any programming capable of setting two or more print path speeds—the speed or speeds at which print engine 28 passes pages 37 and 37' through print path 40. Memory 36 represents generally any memory device or devices used by formatter 32 and speed selector 34.

Figure 4:
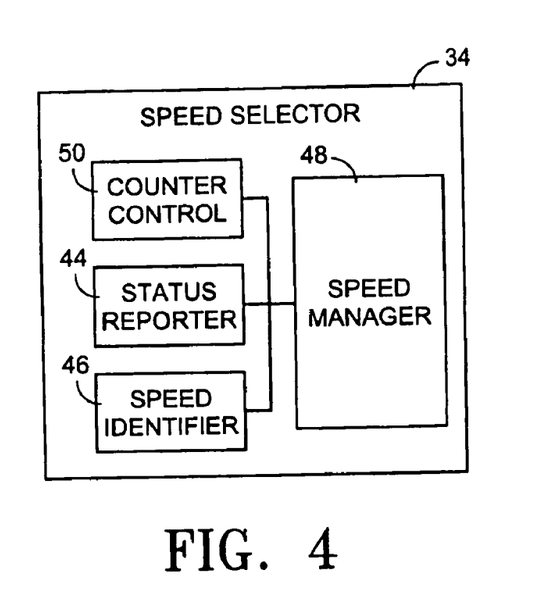
FIG. 4 at is a schematic representation of an exemplary speed selector according to an embodiment of the present invention.

Referring to FIG. 4, speed selector 34 includes status reporter 44, speed identifier 46, speed manager 48, and counter control 50. Status reporter 44 represents generally any programming capable of identifying the status of print path 40. For example, the status of print path 40 can be determined to be empty or operating at a given speed. Image forming device 14 may be able to support two or more print path speeds. Speed identifier 46 represent any programming capable of identifying the maximum print path speed or speed available for processing page 37. For example, speed identifier 46 may identify that page 37 may be capable of being processed at a faster or at a slower speed. Where page 37 can be processed at the faster speed, it can usually be processed at the slower speed as well. To perform its function, speed identifier 46 reads meta-data 22 relating to page 37 and identifies printing options that affect print path speed. If a given print option requires a slower print path speed, the slower speed is identified as the maximum. Otherwise, the faster speed is identified.

Speed manager 48 represents generally any programming capable of setting a print path speed based upon a print path status identified by status reporter 44, a maximum speed identified by speed identifier 44, and the current value of a speed reduction counter. Counter control 50 represents generally any programming capable of maintaining a speed reduction counter. A speed reduction counter is a variable used to keep track of the number of times speed manager 48 has set a reduced print path speed. A reduced print path speed is a speed that is slower than the maximum speed identified by speed identifier 46. Counter control 50 is responsible for incrementing and resetting the speed reduction counter. For example, each consecutive time speed manager 48 sets a reduced print path speed, counter control 50 may increment the speed reduction counter. Each time speed manager 48 sets a path speed at the maximum speed identified by speed identifier 46, counter control may reset the speed reduction counter to a starting value.

The block diagrams of FIGS. 3-4 show the architecture, functionality, and operation of various embodiments of the present invention. Each block may represent in whole or in part a module, segment, or portion of code that comprises one or more executable instructions to implement the specified logical function(s). Each block may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, infrared, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

OPERATION: The operation of embodiments of the present invention will now be described with reference to the exemplary flow diagrams of FIGS. 5 and 6. FIG. 5, with reference to FIGS. 2-4, illustrates steps taken to select a print path speed. FIG. 6, also with reference to FIGS. 2-4, further illustrates steps for selecting from between two available print path speeds.

Referring first to FIG. 5, the print path status is identified (step 52). In doing so, status reporter 44 may identify that print path 40 is empty, operating at a first speed, or operating at a second speed faster than the first speed. A maximum print path speed for processing page 37 is identified (step 54). To do so, speed identifier 46 identifies print options that affect print path speed. If a given print option requires a slower print path speed, the slower speed is identified as the maximum. Otherwise, the faster speed is identified.

The print path speed is set according to the print path status identified in step 52 and the maximum print path speed identified in step 54 (step 56). For example, where the print path status indicates that print path is empty (page 37' has been deposited in output bin 42), the maximum speed is set as the print path speed. Where the print path status indicates that print path is operating at a speed slower that the maximum speed (page 37' is being printed at the slower speed), the print path speed is set at the slower speed. Where the print path status indicates that print path is operating at a speed equal to or faster than the maximum speed (page 37' is being printed at the faster speed), the print path speed is set at the maximum speed.

FIG. 6 helps to illustrate an example of how the print path speed may be set in step 56 of FIG. 5. In this example, an image forming device supports at least two print path speeds—a first speed and a second speed that is faster than the first speed. The status of the print path can be identified in step 54 by a zero, a one, or a two. Zero indicates that the print path is empty, one indicates that the print path is operating at the fist speed, and two indicates that the print path is operating at the faster second speed. Similarly, the maximum print path speed can be identified by a one or a two. One indicates the maximum speed is the slower first speed, and two indicates that the maximum speed is the faster second speed.

To set a print path speed in step 56, it is first determined whether the print path status identified in step 52 equals one—that is—operating at the slower first speed (step 58). If yes, it is then determined if the identified maximum print path speed equals 2, that is, the faster second speed (step 60). If yes, it is then determined if the speed reduction counter (SRC) exceeds a threshold value (T) (step 62). The threshold value can be any predetermined number like, for example, ten and represents the number of consecutive speed reductions that can occur. A speed reduction occurs when the path speed for printing a page is set at a slower speed even though the page could be printed at a faster speed. If the speed reduction counter does not exceed the threshold value, the print path speed is set at the slower first speed (step 64), and the speed reduction counter is incremented (step 66). Incrementing the speed reduction counter indicates that while a page could have been printed at a faster speed, it was instead printed at a slower speed. This is called a speed reduction. Printing at the faster speed would have required that the print path be cleared. By printing at the slower speed, the delay caused by clearing the print path is avoided.

If it is determined in step 62 that the speed reduction counter exceeds the threshold value, then the print path is cleared (step 68), and the print path speed is set at the faster second speed (step 70). The speed reduction counter is reset to a starting value (step 72). When the speed reduction counter exceeds the threshold value, it is presumed that any delay incurred by clearing the path in step 68 will be outweighed by the increase in print path speed of the current and any future pages. With the speed reduction counter reset, it no longer exceeds the threshold value.

If in step 60, it is determined that the maximum speed identified in step 54 is not the faster second speed, then the print path speed is set at the slower first speed (step 74) and the speed reduction counter is reset (step 76).

If in step 58, it is determined that the print path status identified in step 52 does not equal one, then it is determined if the print path status equals two—meaning that the print path is operating at the faster second speed (step 78). If yes, it is determined if the maximum speed identified in step 54 is the slower first speed (step 80). If the answer in step 80 is yes, the print path is cleared (step 82), the print path speed is set at the maximum print path speed identified in step 54—in this case the slower first speed (step 84). The speed reduction counter is reset (step 86).

If in step 80, the maximum speed identified in step 54 is not the slower first speed, then the print path speed is set at the maximum print path speed identified in step 54—in this case the faster second speed (step 84), and the speed reduction counter is reset (step 86). If in step 78, the print path status identified in step 52 is not two, meaning that the print path status is zero or empty, the print path speed is set at the maximum print path speed identified in step 54—in this case. either the faster second speed or the slower first speed (step 84), and the speed reduction counter is reset (step 86).

It is noted that the present invention can be implemented in an image forming device that supports more that two print path speeds. The modifying terms "first" and "second" as they relate to the print path speed or available print path speed are not intended to indicate that only two speeds are possible. They only used to distinguish between two possible speeds. There may be many other possible speeds.

Although the flow charts of FIGS. 5 and 6 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

EXAMPLE: In the following example, illustrated by FIG. 7, an image forming device implementing an embodiment of the present invention is capable of using two print path speeds, a faster one page per second or a slower one page every two seconds. The threshold value for the image forming device is four. Clearing the print path causes a two second delay. Of a series of twenty pages being printed, the first, third, fifth, seventh, and ninth require the slower speed and the rest can be printed at the faster speed.

Figure 7:
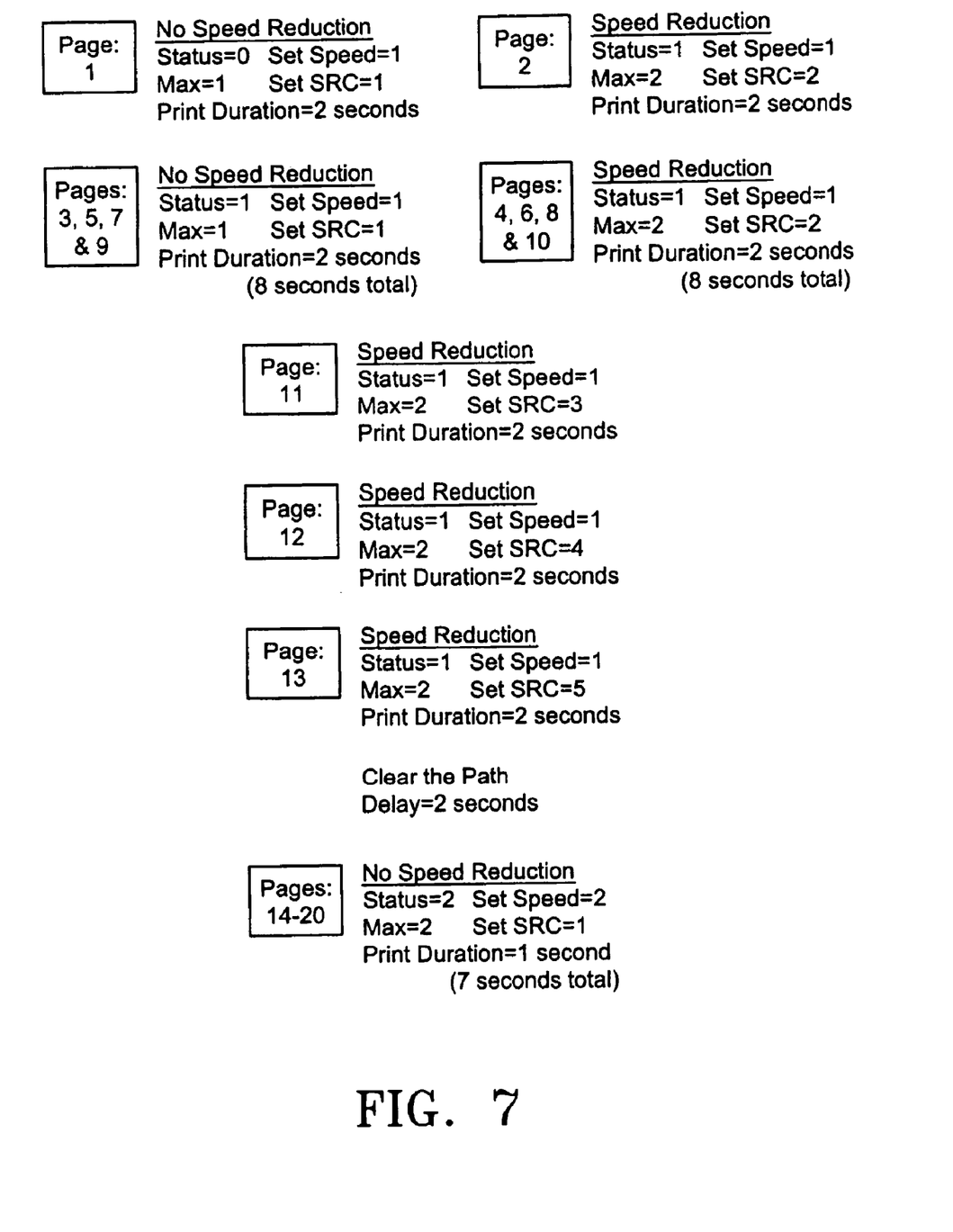
FIG. 7 is a chart that helps illustrate an example in which a sequence of twenty pages are printed by an image forming device that implements an embodiment of the present invention.

The first page, required to be printed at the slower speed, takes two seconds to print, and the speed reduction counter is reset to one. Because the first page is printing at the slower speed, the second page, although it can be printed at the faster speed, is also printed at the slower speed, and the speed reduction counter is incremented to two. Similar logic follows for pages three through ten with each of those pages being printed at the slower speed. Following page ten, the speed reduction counter is incremented to two. Twenty seconds are required to print the first ten pages.

Like page ten, pages eleven through thirteen are printed at the slower speed requiring six more seconds. However, the speed reduction counter is incremented after printing each of those three pages until it equals five exceeding the threshold value of four. The print path is cleared causing a two second delay, and pages fourteen through twenty are printed at full speed consuming seven more seconds.

The preceding process requires thirty-five seconds to print twenty pages, a print speed of thirty-four pages per minute. Imagine for a moment the print path speed were set at the maximum for each page meaning that pages one, three, five, seven, and nine all were all printed at the slower speed and the remaining pages were all printed at the faster speed. It would take ten seconds to print pages one, three, five, seven, and nine and fifteen seconds to print the remaining pages. However, each time the print path speed changed between each of the first ten pages, the print path would have to be cleared. This would result in delays adding another eighteen seconds. A total of forty-three seconds would be required to print the same twenty pages—a print speed of twenty-eight pages per minute.

CONCLUSION: The present invention has been shown and described with reference to the foregoing exemplary embodiments. It is to be understood, however, that other forms, details, and embodiments may be made without departing from the spirit and scope of the invention which is defined in the following claims.

What is claimed is:

1. A method, comprising identifying a print path status, identifying a maximum available print path speed for processing a page, and setting a print path speed for the page according to one or more of the identified print path status, the identified available print path speed, and a speed reduction counter;

wherein the maximum available print path speed is one of a first speed and a second speed, the second speed being faster than the first speed; and wherein setting the print path speed comprises setting the second speed as the print path speed if the print path status is identified as operating at the first speed, the maximum available speed is identified as the second speed and the speed reduction counter exceeds a threshold value, the speed reduction counter tracking a number of times the first speed has been set as the print path speed when the second speed had been identified as the maximum available print path speed.

2. The method of claim 1, wherein identifying the print path status comprises identifying the print path status as empty, operating at the first speed, or operating at the second speed that is faster than the first speed.

3. The method of claim 1, further comprising clearing the print path if the identified maximum available print path speed is the first speed, and the print path status is determined to be operating at the second speed that is faster than the first speed.

4. The method of claim 1, wherein setting the print path speed comprises setting the identified maximum available print path speed as the print path speed if the print path status is determined to be empty.

5. The method of claim 4, further comprising resetting the speed reduction counter.

6. The method of claim 1, wherein setting the print path speed comprises setting the identified maximum available print path speed as the print path speed if the print path status is determined to be operating at the second speed.

7. The method of claim 6, further comprising resetting the speed reduction counter.

8. The method of claim 1, wherein setting the print path speed comprises setting the first speed as the print path speed if the print path status is determined to be operating at the operating at the first speed.

9. The method of claim 8, further comprising incrementing the speed reduction counter.

10. The method of claim 1, further comprising clearing the print path if the print path status is determined to be operating at the first speed.

11. The method of claim 1, further comprising resetting the speed reduction counter.

12. The method of claim 1 wherein:
identifying a print path status comprises identifying a print path status as operating at the first speed;
the second speed is identified as the maximum available print path speed; and
setting a print path speed comprises:
setting a print path speed at the second speed for the page if speed reduction counter exceeds the threshold value; and
setting the print path speed at the first speed for the page if the speed reduction counter does not exceed the threshold value.

13. The method of claim 1, wherein:
identifying a print path status comprises identifying a print path status as empty, operating at a first speed, or operating at a second speed that is faster than the first speed; and
setting a print path speed according to the identified print path status comprises:
setting the identified maximum available print path speed as a print path speed for processing the page and resetting a speed reduction counter if the print path status is identified as empty or if the print path status is identified as operating at the second speed;
setting the second speed as the print path speed for processing the page and resetting the speed reduction counter if the print path status is identified as operating at the first speed, the second speed is the identified maximum available print path speed, and the speed reduction counter exceeds a threshold value; and
setting the first speed as the print path speed for processing the page and incrementing the speed reduction counter if the print path status is identified as operating at the first speed, the second speed is the identified maximum available print path speed, and the speed reduction counter does not exceed the threshold value.

14. A computer readable medium having computer executable instructions for identifying a print path status, identifying a maximum available print path speed for processing a page, and setting a print path speed for the page according to one or more of the identified print path status, the identified available print path speed, and a speed reduction counter;
wherein the maximum available speed is one of a first speed and a second speed, the second speed being faster than the first speed; and
wherein the instructions for setting the print path speed comprise instructions for setting the second speed as the print path speed if the print path status is identified as operating at the first speed, the maximum available print path speed is identified as the second speed and the speed reduction counter exceeds a threshold value, the speed reduction counter tracking a number of times the first speed has been set as the print path speed when the second speed had been identified as the maximum available print path speed.

15. The medium of claim 14, wherein the instructions for identifying the print path status include instructions for identifying the print path status as empty, operating at the first speed, or operating at the second speed that is faster than the first speed.

16. The medium of claim 14, having further instructions for clearing the print path if the identified maximum available print path speed is the first speed, and the print path status is determined to be operating at the second speed that is faster than the first speed.

17. The medium of claim 14, wherein the instructions for setting the print path speed includes instructions for setting the identified maximum available print path speed as the print path speed if the print path status is determined to be empty.

18. The medium of claim 17, having further instructions for resetting the speed reduction counter.

19. The medium of claim 14, wherein the instructions for setting the print path speed include instructions for setting the identified maximum available print path speed as the print path speed if the print path status is determined to be operating at the second speed.

20. The medium of claim 19, having further instructions for resetting the speed reduction counter.

21. The medium of claim 14, wherein the instructions for setting the print path speed includes instructions for setting the first speed as the print path speed if the print path status is determined to be operating at the operating at the first speed.

22. The medium of claim 21, having further instructions for incrementing the speed reduction counter.

23. The medium of claim 14, having further instructions for clearing the print path if the print path status is determined to be operating at the first speed.

24. The medium of claim 14, having further instructions for resetting the speed reduction counter.

25. The computer readable medium of claim 14, wherein:
the instructions for a print path status include instructions for identifying a print path status as operating at one of the first speed and the second speed;
the instructions for setting a print path speed according to the identified print path status include instructions for:
setting a print path speed at the second speed for the page if the print path status is identified as operating at the first speed, the identified maximum available print path speed is the second speed, and the speed reduction counter exceeds the threshold value; and
setting the print path speed at the first speed if the print path status is identified as operating at the first speed, the identified maximum available print oath speed is the second speed, and the speed reduction counter does not exceed the threshold value.

26. The computer readable medium of claim 14, wherein:
the instructions for a print path status include instructions for identifying a print path status as empty, operating at a first speed, or operating at a second speed that is faster than the first speed; and
the instructions for setting a print path speed according to the identified print path status include instructions for:
setting the identified maximum available print path speed as a print path speed for processing the page and resetting a speed reduction counter if the print path status is identified as empty or if the print path status is identified as operating at the second speed;
setting the second speed as the print path speed for processing the page and resetting the speed reduction counter if the print path status is identified as operating at the first speed, the second speed is the identified maximum available print path speed, and the speed reduction counter exceeds a threshold value;
setting the first speed as the print path speed for processing the page and incrementing the speed reduction counter if the print path status is identified as operating at the first speed, the second speed is the identified maximum available print path speed, and the speed reduction counter does not exceed the threshold value.

27. A system for selecting a print path speed, comprising a status reporter operable to identify a print path status, a speed identifier operable to identify a maximum available print path speed for processing a page, and a speed manager operable to set a print path speed for the page according to one or more of the print path status, the identified available print oath speed, and a speed reduction counter;
wherein the maximum available speed is one of a first speed and a second speed, the second speed being faster than the first speed; and
wherein speed manager is operable to set the second speed as the print path speed if the print path status is identified as operating at the first speed, the maximum available speed is identified as the second speed and the speed reduction counter exceeds a threshold value, the speed reduction counter tracking a number of times the first speed has been set as the print oath speed when the second speed had been identified as the maximum available print path speed.

28. The system of claim 27, wherein the status reporter is operable to identify the print path status as empty, operating at the first speed, or operating at the second speed that is faster than the first speed.

29. The system of claim 27, further comprising a counter control operable to:
reset the speed reduction counter upon determining that the speed manager set the print path speed at the second print path speed; and
increment the speed reduction counter upon determining that the speed manager set the print path speed at the first speed and the speed identifier identified the second speed as the maximum available print path speed.

30. The system of claim 27, wherein:
the status reporter operable to identify a print path status as operating at one of the first speed and the second speed,
the speed manager is operable to set a print path speed at the second speed for the page if the print path status is identified as operating at the first speed, the identified maximum available print path speed is the second speed, and the speed reduction counter exceeds a threshold value and to set the print path speed at the first value if the print path status is identified as operating at the first speed, the identified maximum available print path speed is the second speed, and the speed reduction counter does not exceed a threshold value.

31. The system of claim 27, wherein:
the status reporter operable to identify a print path status as empty, operating at a first speed, or operating at a second speed that is faster than the first speed;
the system includes a counter control operable to selectively increment and reset a speed reduction counter; and
the speed manager is operable to:
set the identified maximum available print path speed as a print path speed for processing the page and direct the counter control to reset the speed reduction counter if the print path status is identified as empty or if the print path status is identified as operating at the second speed;
set the second speed as the print path speed for processing the page and direct the counter control to reset the speed reduction counter if the print path status is identified as operating at the first speed, the second speed is the identified maximum available print path speed, and the speed reduction counter exceeds a threshold value; and
set the first speed as the print path speed for processing the page and direct the counter control to increment the speed reduction counter if the print path status is identified as operating at the first speed, the second speed is the identified maximum available print path speed, and the speed reduction counter does not exceed the threshold value.

* * * * *

UNITED STATES PATENT AND TRADEMARK OFFICE
CERTIFICATE OF CORRECTION

PATENT NO. : 7,522,298 B2 Page 1 of 1
APPLICATION NO. : 10/449275
DATED : April 21, 2009
INVENTOR(S) : Brian Watts It is certified that error appears in the above-identified patent and that said Letters Patent is hereby corrected as shown below:

In column 8, line 65, in Claim 25, delete "oath" and insert -- path --, therefor.

In column 9, line 31, in Claim 27, delete "oath" and insert -- path --, therefor.

In column 9, line 42, in Claim 27, delete "oath" and insert -- path --, therefor.

Signed and Sealed this

First Day of September, 2009

David J. Kappos
*Director of the United States Patent and Trademark Office*